United States Patent
Adomeit

(10) Patent No.: US 10,723,407 B2
(45) Date of Patent: Jul. 28, 2020

(54) LINE FIXING ELEMENT FOR LINES ARRANGED IN BICYCLE FRAME TUBES, BICYCLE FRAME TUBES, AS WELL AS METHOD FOR ARRANGING AND FIXING A LINE IN A BICYCLE FRAME TUBE

(71) Applicant: Canyon Bicycles GmbH, Koblenz (DE)

(72) Inventor: Michael Adomeit, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 618 days.

(21) Appl. No.: 15/198,704

(22) Filed: Jun. 30, 2016

(65) Prior Publication Data

US 2017/0001677 A1 Jan. 5, 2017

(30) Foreign Application Priority Data

Jul. 2, 2015 (DE) .......................... 10 2015 212 446

(51) Int. Cl.
- B62J 11/19 (2020.01)
- B62K 19/30 (2006.01)
- F16L 3/137 (2006.01)

(52) U.S. Cl.
CPC ............... B62K 19/30 (2013.01); B62J 11/19 (2020.02); F16L 3/137 (2013.01)

(58) Field of Classification Search
CPC ... Y10T 24/1498; Y10T 24/141; Y10T 24/14; F16L 3/233; F16L 3/137; H02G 3/32; B60R 16/0215; B62K 19/30; B62J 6/18
See application file for complete search history.

(56) References Cited

U.S. PATENT DOCUMENTS

| | | | | |
|---|---|---|---|---|
| 2,969,216 A | * | 1/1961 | Hallsey | F16L 3/2332 248/71 |
| 3,525,128 A | * | 8/1970 | Hidassy | B65D 63/1036 24/16 PB |
| 3,550,219 A | * | 12/1970 | Van Buren, Jr. | F16B 21/075 248/73 |
| 3,819,139 A | * | 6/1974 | Jemison | F16L 3/14 248/73 |

(Continued)

FOREIGN PATENT DOCUMENTS

| | | | | |
|---|---|---|---|---|
| DE | 102009054380 A1 | * | 6/2011 | B62J 11/00 |
| EP | 0702444 A1 | | 3/1996 | |

(Continued)

OTHER PUBLICATIONS

"100x Kabelbinder Befestigung 100 Stuck Fur Kabelbaum & Drahte (Max Breite 9mm)—Kostenloser Versandi: Amazon.de: Baumarkt"; Amazon.com, Mar. 13, 2012, 5 pages, https://www.amazon.de/dp/B007JVWFWY/ref=psdc_2076362031_t3_B007JVWF38.

*Primary Examiner* — Daniel J Wiley
(74) *Attorney, Agent, or Firm* — The Webb Law Firm

(57) ABSTRACT

A line fixing element for lines arranged in bicycle frame tubes includes a loop element. The loop element defines an opening width, with the loop element being designed similar to a cable strap. A holding head of the loop element is received by a holding element. The holding element further serves for fixation in a bicycle frame tube, with the loop element being arranged in the frame tube. The line to be fixed is passed through the loop element and fixed by reducing the opening width.

10 Claims, 2 Drawing Sheets

(56) References Cited

U.S. PATENT DOCUMENTS

| | | | |
|---|---|---|---|
| 3,823,254 A | 7/1974 | Smith | |
| 4,269,379 A * | 5/1981 | McCormick | F16L 3/233 24/16 PB |
| 4,272,870 A * | 6/1981 | McCormick | B65D 63/1072 24/16 PB |
| 4,435,881 A * | 3/1984 | Yamaguchi | F16B 2/08 24/16 PB |
| 4,680,834 A * | 7/1987 | Andre | F16L 3/2336 24/16 PB |
| 5,236,212 A * | 8/1993 | Duehring | B62K 19/30 280/281.1 |
| 5,386,615 A * | 2/1995 | Bernard | B65D 63/14 24/16 PB |
| 5,653,409 A * | 8/1997 | White, Jr. | F16L 3/137 24/16 PB |
| 6,533,226 B2 * | 3/2003 | Geiger | F16L 3/233 248/68.1 |
| 6,704,972 B2 * | 3/2004 | Pyle | B65D 63/1072 24/16 PB |
| 6,854,693 B2 * | 2/2005 | Harrison | H02G 3/32 24/16 PB |
| 7,503,528 B2 * | 3/2009 | Adams | F16B 5/0685 24/297 |
| 7,566,065 B2 * | 7/2009 | Fukui | B62J 6/18 280/281.1 |
| 7,854,442 B2 * | 12/2010 | Onogi | B62J 6/18 280/281.1 |
| 8,281,461 B2 * | 10/2012 | Geiger | B65D 63/14 24/16 PB |
| 9,120,525 B2 * | 9/2015 | Colegrove | B29C 45/14786 |
| 9,533,808 B2 * | 1/2017 | Berglund | F16L 3/233 |
| 9,725,220 B2 * | 8/2017 | Dietrich | B65D 63/1018 |
| 9,840,689 B2 * | 12/2017 | Chaussin | C12M 29/00 |
| 9,849,931 B2 * | 12/2017 | Colegrove | B29C 45/14786 |
| 2004/0104314 A1 | 6/2004 | Harrison et al. | |
| 2007/0108723 A1 * | 5/2007 | Fukui | B62J 6/18 280/276 |
| 2010/0051758 A1 | 3/2010 | Onogi et al. | |
| 2012/0175471 A1 * | 7/2012 | Lanz | B62J 99/00 248/73 |
| 2013/0009381 A1 * | 1/2013 | Colegrove | B29C 45/14786 280/288.3 |
| 2014/0131974 A1 * | 5/2014 | Colegrove | B29C 45/14786 280/279 |
| 2014/0312183 A1 * | 10/2014 | Berglund | F16L 3/233 248/73 |
| 2015/0033509 A1 * | 2/2015 | Dietrich | B65D 63/1018 24/16 PB |
| 2015/0329167 A1 * | 11/2015 | Colegrove | B29C 45/14786 29/527.1 |
| 2017/0334621 A1 * | 11/2017 | Dietrich | B65D 63/1018 |

FOREIGN PATENT DOCUMENTS

| | | |
|---|---|---|
| EP | 2159140 A2 | 3/2010 |
| EP | 2159149 A2 | 3/2010 |

* cited by examiner

LINE FIXING ELEMENT FOR LINES ARRANGED IN BICYCLE FRAME TUBES, BICYCLE FRAME TUBES, AS WELL AS METHOD FOR ARRANGING AND FIXING A LINE IN A BICYCLE FRAME TUBE

CROSS-REFERENCE TO RELATED APPLICATION

This application claims priority to German Patent Application No. 10 2015 212 446.0 filed Jul. 2, 2015, the disclosure of which is hereby incorporated in its entirety by reference.

BACKGROUND OF THE INVENTION

Field of the Invention

The following disclosure relates to a line fixing element for lines arranged in bicycle frame tubes, as well as to a method for arranging and fixing a line in a bicycle frame tube.

Description of Related Art

In modern bicycles lines, such as hydraulic lines, electric lines and Bowden cables are often placed inside frame tubes. In this context it is a problem that clattering sounds may occur. This is the case in particular with lines having a great own weight, such as hydraulic lines, which, different from Bowden cables, further are not pre-tensioned. These clattering noises are disadvantageous in particular with thin-walled tubes and tubes of CFRP, since corresponding tubes additionally act resonance bodies.

To avoid such clattering noises, it is known to enclose the lines with foamed material. However, this is a very complex mounting method. Further, this may interfere with the mechanical cables. With bicycle frames of aluminum it is known to provide guide tubes in the frame that are continuously welded thereto. On the one hand, this is only possible with aluminum frames and has the disadvantage that the weight is increased thereby and manufacture is expensive. It is another possibility to provide plastic clips connected with the lines, which are slipped on the line and cause a kind of clamping or blocking of the line in the tube. This is an utterly intricate process which is also difficult in terms of handling. Again, interference with mechanical cables may be caused thereby.

From EP 2 159 149 it is known in particular for mechanical cables, such as Bowden cables, to place the Bowden cables in the frame tube such that two Bowden cables cross. This reduces the risk of cable vibration and thus the risk of the cables hitting against the inner side of the frame tube. However, making lines or cables cross each other yields satisfactory results only with Bowden cables that are pre-tensioned.

SUMMARY OF THE INVENTION

Thus, it is an object of the present disclosure to provide a line fixing element for lines arranged in bicycle frame tubes, which allows a simple fixing of the lines in the bicycle frame tube. Further, it is an object of the present disclosure to provide a corresponding method for arranging and fixing at least one line in a bicycle tube.

The object is achieved according to the following disclosure.

The line fixing element for lines arranged in bicycle frame tubes has a loop element. The loop element is designed such that its opening width is adjustable. Thus, the loop may in particular be tightened. The loop element is connected with a holding element holding the loop element. Using the holding element, the line fixing element may be fixed to a bicycle tube. The fastening is such that the loop element is arranged in the bicycle frame tube. Upon assembly, lines to be fixed are thus passed through the loop element. By reducing the opening width of the loop element, i.e. preferably by tightening the loop, the corresponding lines are fixed in the bicycle frame tube. In particular, the line fixing element has the advantage that it is very light and that the handling is also very simple, since all that is necessary is to reduce the opening width of the loop element in order to achieve a fixation of the lines in the bicycle frame tube. It is further possible, for example, not to fix mechanical cables in the bicycle frame tube so that the remaining lines are fixed by the line fixing element of the present disclosure and an interference with the mechanical cables, such as the Bowden cables, is avoided. It is also possible to fix the mechanical cables separately at another position in the frame tube so that interferences between the lines and the cables no longer occur. Above that, the line fixing element can be manufactured very economically and also the assembly is simple and thus economic.

In a preferred embodiment the loop element may be locked in a fixing position, i.e. in the position in which the lines are fixed. This guarantees a permanent retaining of the lines in the corresponding position. Locking may be realized by a corresponding closing element, such as a clamping lever, which may for example fix a free end of the loop element, or the like.

It is particularly preferred that the loop element has a holding head with an opening through which a band element of the loop element is passed. In this regard, it is preferred for a locking in the fixing position that a corresponding locking element is arranged in the opening of the holding head. For example, to reduce the opening width of the loop element, the band element may be pulled through the opening, whereafter the band element may be clamped in the opening. This may be effected for example by a clamping lever, insertion of a clamping wedge or the like. It is particularly preferred to provide a latch element for locking, which is provided in particular in the holding head, i.e., as is particularly preferred, in the opening of the holding head. This latch element preferably cooperates with a latch element provided on the band element.

It is particularly preferred to design the loop element in the manner of a cable strap or to provide a cable strap as the loop element. The band element of this loop element has corresponding latch connections. Further, the cable strap has a holding head through which the band element is passed and is automatically locked when being tightened. To reduce the opening width after the lines to be fixed have been passed through the loop element, it is therefore only necessary to pull the free end of the cable strap through the opening of the holding head until the loop element has the desired opening width.

The holding element is preferably designed such that it may be inserted, in particular from the outside, into an opening of the frame tube. It is preferred that the holding element has a receiving element for receiving the holding head of the loop element. Thereby, a defined position of the holding head and thus of the end of the band element of the loop element is defined. Therefore it is possible to grip the end of the band element in a simple manner for mounting and to pull the same through the opening of the holding head. In particular, the receiving element is designed such that the opening of the holding head is well accessible and that the receiving element does not interfere with the tightening of the band element. With a holding head of a parallelepiped shape, for example, the receiving element has a preferably V-shaped cross section so that the holding head can be placed in a defined position, while the opening is well accessible.

For a secure arrangement of the holding element in or at a bicycle frame tube, the holding element has a clamping element. In particular, this element is formed by elastic protrusions so that the holding element is pressed into an opening in the bicycle frame tube and is fixed therein by clamping. For example, the clamping element has two ring segment-shaped elastic clamping parts which are in particular arranged opposite each other. In particular, it has to be taken care that, after fixation of the lines in the bicycle frame tube, it is also guaranteed that the holding element is retained as well and that slipping out is avoided.

It is further preferred that the holding element has a bearing element extending into the opening of the loop element. This element serves for the at least one line to bear thereon in the closed state of the loop element, i.e. when the loop element is in the fixing position or the tightened position. In this regard, the bearing element preferably holds the line at a little distance from the inner side of the bicycle frame tube, in particular also to avoid damage to the line. For this purpose, a preferred development of the bearing element may have a concave bearing surface so that in particular if only a single line is fixed, a clearly defined bearing surface is provided for the same.

The disclosure further relates to a bicycle frame tube with an entry opening and an exit opening. A line may be passed into and out of the bicycle frame tube through these openings. It is further possible to pass a plurality of lines into and out of the tube through these openings and/or to provide a plurality of entry and/or exit openings. Further according to the disclosure, the bicycle frame tube is provided with a line fixing element as described above, in particular according to the preferred developments.

Preferably, the bicycle frame tube has a receiving opening for receiving the line fixing element, in particular the holding element of the line fixing element. The holding element is retained in this receiving opening preferably in a clamping manner.

Further, holding members are arranged preferably in the at least one entry opening as well as preferably also in the at least one exit opening of the bicycle frame tube. These members also serve to avoid a displacement of the lines on their own. This may be achieved by providing holding members having a certain elasticity and exerting a corresponding friction on the outer side of the line so that a displacement is only possible if a certain force is exerted. Preferably, an entry opening and a corresponding exit opening are arranged diagonally with respect to each other, the exit opening being an opening through which the line inserted through the entry opening exits the frame tube.

Preferably, the line fixing element is arranged substantially in the central region between the entry and exit openings. If the line fixing element is provided in the down tube of a bicycle frame tube, it is particularly preferred that the receiving opening for the holding element of the line fixing element is provided in the area of the bottle holder. Preferably, the receiving opening is arranged between the two fixing elements of the bottle holder so that the receiving opening is covered in the mounted state of the bottle holder.

Generally, it is preferred that in particular hydraulic lines, possibly also electric lines are passed through the loop element and are correspondingly fixed by the same. Bowden cables are preferably arranged outside the loop element and may possibly extend in a crossing manner as described in EP 2 159 149. It is further preferred that liners are placed in the frame tubes as the frame is manufactured, the liners being small tubes of plastic material with a diameter of ca. 2.5 mm. The liners serve to assist in assembly such that the corresponding lines are inserted into the liners during assembly, whereby a defined path is guaranteed. In a referred embodiment the liners are passed through the loop element before the lines are inserted.

The disclosure further relates to a method for arranging and fixing at least one line in a bicycle frame tube, the bicycle frame tube having at least one entry opening for one or a plurality of lines and at least one exit opening for one or a plurality of lines. Placing and fixing are achieved with the help of the line fixing element of the present disclosure as described above. According to the method of the present disclosure, first, the at least one line is inserted through the at least one entry opening in the bicycle frame tube. The at least one line is then passed through the opening of the loop element and is then guided out of the bicycle frame tube through the exit opening. According to the disclosure, in a next step, the opening width of the loop element is reduced. By tightening the loop element appropriately, the same is made to assume its fixing position. As described above with reference to the line fixing element, this is preferably done by passing a free end of a band element through an opening of a holding head of the loop element. In this regard, it is particularly preferred that the fixation of the band element is performed in particular automatically by means of corresponding latch elements, the loop element preferably being a cable strap.

For a simplified assembly, it is further preferred that corresponding liners are arranged in the frame tube and are also passed through the loop element before the at least one line is inserted.

The method of the present disclosure is developed in an advantageous manner as described with respect to the line fixing element.

The line fixing element of the present disclosure is of course not limited to a use with the top or down tubes of a bicycle frame, but it may also be used with other tube elements. In particular, it is possible, for example, to fix a plurality of hydraulic lines with one line fixing element. This is of interest in particular with mountain bikes. Of course, a plurality of line fixing elements may be arranged in a tube of a bicycle frame.

It is an essential advantage of the disclosure that the fixing element can be mounted in a very simple and economic manner from outside. For this purpose, the frame tube must simply be provided with a corresponding opening of about 10 mm, for example. Thereby, it is also possible e.g. to retrofit fixing elements at a later time.

BRIEF DESCRIPTION OF THE DRAWINGS

The invention will be described in detail hereunder with reference to a preferred embodiment and to the accompanying drawings.

In the Figures.

DESCRIPTION OF THE INVENTION

Figure 1:
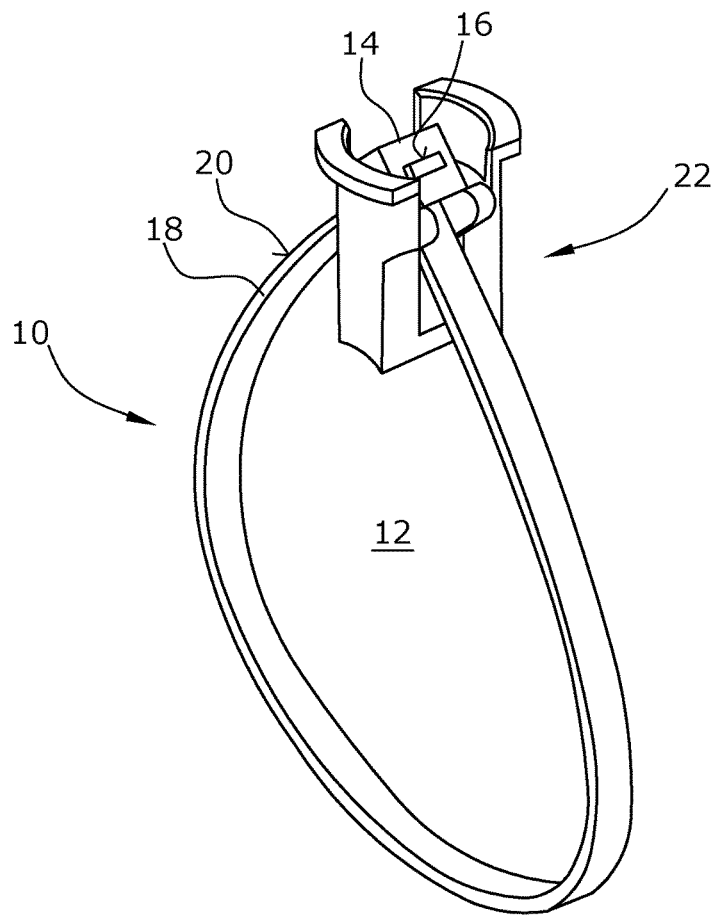
FIG. 1 is a schematic perspective view of a line fixing element.

The line fixing element of the present disclosure has a loop element 10. The latter defines an opening width 12, with the lines to be fixed being passed through the opening 12. The loop element 10 includes a holding head 14 which, in a preferred embodiment, is designed similar to the holding head of a cable strap. The holding head 14 has an opening 16 through which a band element 18 of the loop element 10 is passed. In a preferred embodiment, latch elements are provided in the opening 16, analogous to a cable strap, which latch elements cooperate with latch elements provided on an outer side 20 of the band element 18. By pulling on the free end of the band element 18, the opening width 12 is reduced and, at the same time, is locked in the corresponding position, as is typical for cable straps.

Figure 3:
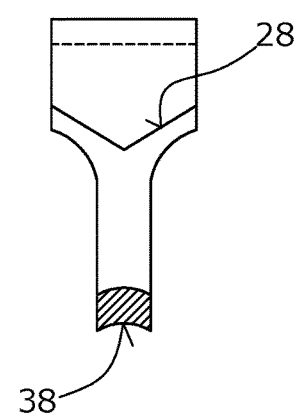
FIG. 3 is a schematic sectional view along line III-III in FIG. 2.
Figure 4:
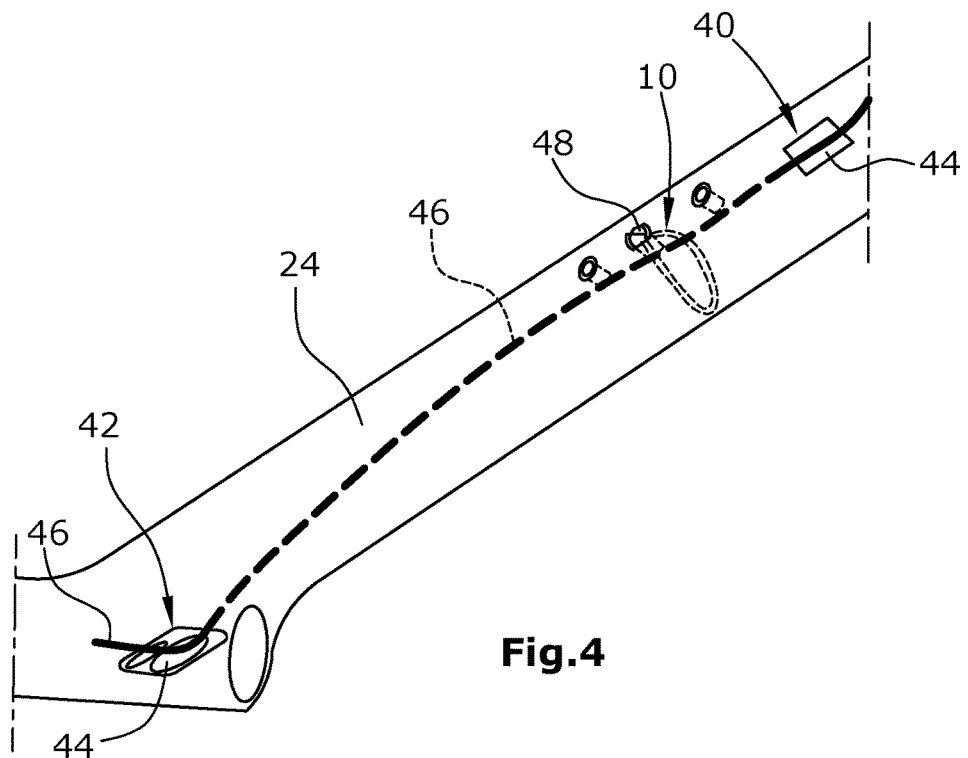
FIG. 4 is a schematic illustration of a line fixing element arranged in a bicycle frame tube, the bicycle frame tube being illustrated in a transparent manner for clarity.
Figure 5:
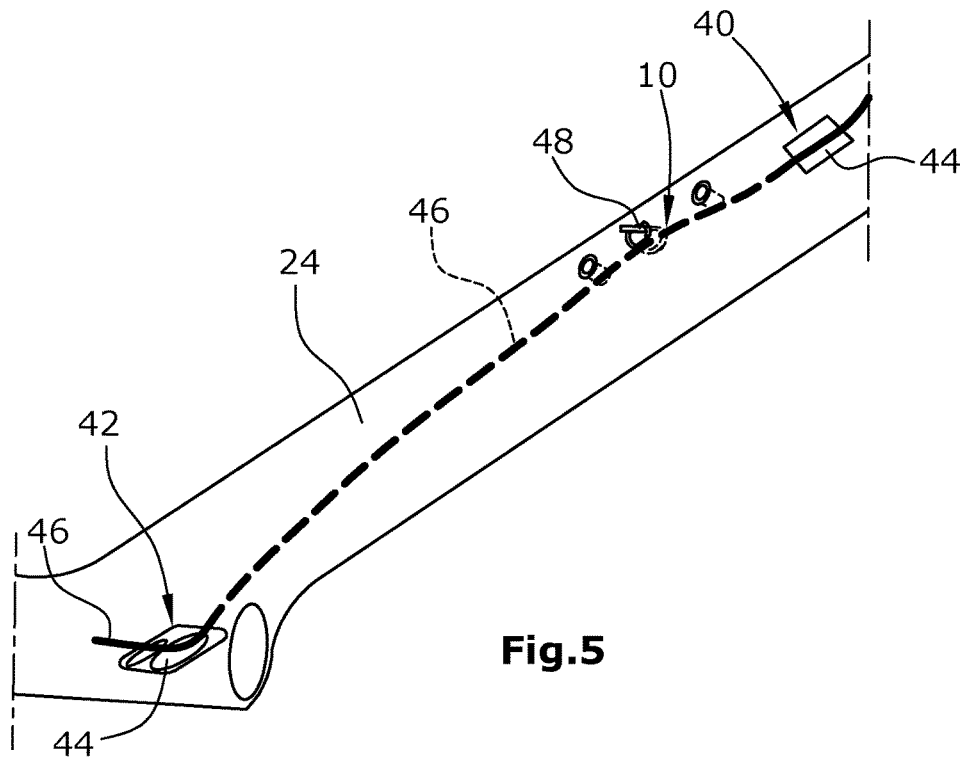
FIG. 5 the bicycle frame tube shown in FIG. 4 with the line fixing element closed.

Further, the line fixing element has a holding element 22. The latter serves, on the one hand, to hold the loop element 10 and, on the other hand, to fasten the same to a bicycle frame tube 24 (FIGS. 4 and 5). The holding element 22 includes a receiving element or a receiving portion (FIG. 7). The holding head 14 is arranged in the same. With an in particular parallelepiped-shaped holding head 14, the receiving element has a V-shaped bearing surface 28 (FIG. 3), seen in side view.

Figure 2:
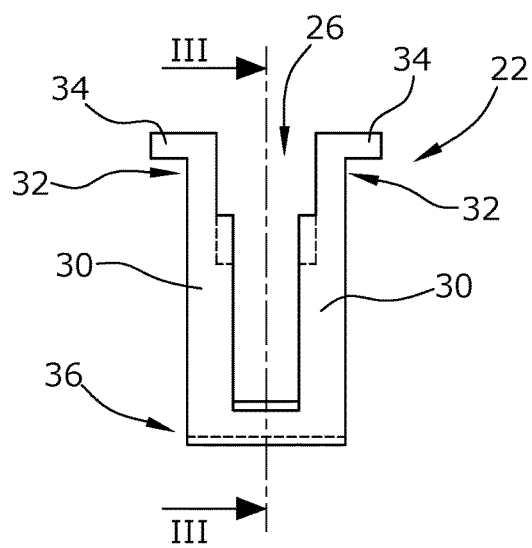
FIG. 2 is a schematic side view of the holding element of the line fixing element.

In the embodiment illustrated the holding element 22 is of a U-shaped or fork-shaped design (FIG. 2), seen in side view. The two arms or side members 30 of the holding element 20 are thereby elastically deformable so that a simple insertion of the holding element 20 into an opening in a frame tube 24 is possible. In this manner, the holding element 22 is clampingly retained in the receiving opening 48 of the frame tube, wherein the regions 32 serve as clamping elements. Further, the holding element 22 has two outward projecting tabs 34 which prevent the holding element from being inserted too far into the frame element. Moreover, a clearly defined position is thereby ensured.

The holding element 22 further includes a bearing element 36 which, in the mounted state, extends into the frame tube and into the opening width 12 of the loop. In the fixed state, the at least one line bears on a lower side 38 of the bearing element 36. For this purpose, the bearing is preferably concavely shaped.

The bicycle frame tube 24, which may be a down tube, for example, although it may also be another frame tube, has an entry opening 40, as well as an exit opening 42. Holding members 44 are arranged in the entry opening 40 and in the exit opening 42, which members ensure that the single line 46 in the embodiment illustrated is held in particular by friction. The line 46 is passed through the loop element. For this purpose, it is possible to provide a corresponding liner before inserting the line 46 itself, the liner also being passed through the loop element 10 so that the line is introduced into the liner for assembly.

To fix the line 46, the loop element is closed. To achieve this, the free end of the band element 18 in the embodiment illustrated is pulled through the opening 16 in the holding head 14 and is fixed by the latch elements provided thereon and on the outer side 22 of the band element. In doing so, the loop element 10 is preferably tightened completely so that the line 46 is fixed as illustrated in FIG. 5.

The invention claimed is:

1. A line fixing element for fixing lines inside bicycle frame tubes, comprising:
    a loop element having an adjustable opening width and configured to extend into a bicycle frame tube such that at least one line arranged inside the bicycle frame tube is received by the opening width, and
    a holding element holding the loop element, the holding element being adapted to be inserted through a receiving opening of a bicycle frame tube from an outside of the bicycle frame tube and adapted to be fastened to the receiving opening of the bicycle frame tube,
    wherein the opening width is adjustable from outside the bicycle frame tube when the loop element is fastened to the bicycle frame tube by moving the loop element through the receiving opening,
    wherein the holding element comprises a clamping element to clampingly hold on and/or in the bicycle frame tube.

2. The line fixing element of claim 1, wherein the loop element is adapted to be locked in a fixing position in which the at least one line is fixed.

3. The line fixing element of claim 1, wherein the loop element has a holding head with an opening through which a band element of the loop element is passed.

4. The line fixing element of claim 3, wherein the holding element comprises a receiving element for receiving the holding head of the loop element.

5. The line fixing element of claim 1, wherein the loop element comprises a cable strap.

6. The line fixing element of claim 1, wherein the holding element has a bearing element protruding into an opening of the loop element for the at least one line to bear thereon in a closed state of the loop element.

7. A method for arranging and fixing at least one line in a bicycle frame tube using a line fixing element of claim 1, the bicycle frame tube having an entry opening for said at least one line and an exit opening for said at least one line, the method comprising the following steps:
    inserting the line fixing element into the receiving opening of the bicycle frame tube from an outside of the bicycle frame tube;
    inserting said at least one line through said entry opening,
    passing said at least one line through said exit opening, and
    reducing the opening width of the loop element.

8. The method of claim 7, wherein reducing the opening width is effected by pulling a free end of a band element through an opening of a holding head of the loop element.

9. A bicycle frame tube comprising:
    an entry opening for at least one line,
    an exit opening for the at least one line, and
    a line fixing element for fixing the at least one line inside the bicycle tube frame, the line fixing element comprising:
        a loop element having an adjustable opening width and extending into the bicycle frame tube such that the at least one line is received by the opening width, and
        a holding element holding the loop element, the holding element being inserted into a receiving opening of the bicycle frame tube from an outside of the bicycle frame tube, and being fastened to the bicycle frame tube, wherein the opening width of the loop element is adjustable from outside the bicycle frame tube by moving the loop element through the receiving opening; and wherein the holding element comprises a clamping element to clampingly hold on and/or in the bicycle frame tube.

10. The bicycle frame tube of claim 9, wherein holding members are arranged in the entry opening or the exit opening.

* * * * *